US006976433B1

(12) United States Patent  (10) Patent No.: US 6,976,433 B1
Neumann  (45) Date of Patent: Dec. 20, 2005

(54) SLIDABLE COVER ASSEMBLY FOR MERCHANDISE CARRYING VEHICLE PLATFORMS

(76) Inventor: Dietmar Neumann, 67 Lakeshore Road, Pointe Claire (CA) H9S 4H5

( * ) Notice: Subject to any disclaimer, the term of this patent is extended or adjusted under 35 U.S.C. 154(b) by 34 days.

(21) Appl. No.: 10/864,358

(22) Filed: Jun. 10, 2004

(51) Int. Cl.$^7$ ................................................. B60P 7/00
(52) U.S. Cl. ............................. 105/377.03; 296/100.12
(58) Field of Search ...................... 105/377.02, 377.03, 105/377.09, 377.1; 296/100.12, 100.11, 100.13, 296/100.16, 100.17, 100.18, 107.13

(56) References Cited

U.S. PATENT DOCUMENTS

| 3,160,436 A | * | 12/1964 | Duddleston ................. 296/105 |
| 5,005,896 A | * | 4/1991 | Li .......................... 296/100.18 |
| 5,152,575 A | | 10/1992 | DeMonte et al. |
| 5,538,313 A | * | 7/1996 | Henning ................. 296/100.12 |
| 6,250,233 B1 | | 6/2001 | Luckring |
| 6,634,697 B1 | * | 10/2003 | Petelka ................... 296/100.12 |
| 6,905,161 B2 | * | 6/2005 | Fliege et al. ........... 296/100.18 |

FOREIGN PATENT DOCUMENTS

| EP | 0955196 | * 10/1999 |
| EP | 0 955 196 A1 | 11/1999 |
| GB | 2157246 | * 10/1985 |

* cited by examiner

Primary Examiner—Mark T. Le
(74) Attorney, Agent, or Firm—Ogilvy Renault LLP; Guy J. Houle

(57) ABSTRACT

A slidable cover assembly for merchandise carrying vehicle platforms is described. The cover assembly comprises a pair of opposed end support frames and a plurality of intermediate frames, each having a top carriage for displacement on a central horizontal top center beam member secured to the platform. Each end support frame and intermediate frames have a top tapered roof truss structure and opposed depending side members. The side members have a side rail engaging carriage at a lower end thereof for displaceable support engagement with a side rail secured to opposed sides of the platform. A tarp is secured to the end support frames and intermediate frames and displaceable therewith from a collapsed condition to an extended condition. Tarp displacement mechanisms are provided to displace the tarp side walls outwardly of the intermediate frames when the frames are displaced closer to one another from the extended condition to the collapsed condition. The end support frames have a vertical connecting wing flange disposed vertically along at least a portion of the opposed depending side members and adapted to be detachably secured to a locking mechanism secured to stationary opposed bulk head frames of the platform.

20 Claims, 9 Drawing Sheets

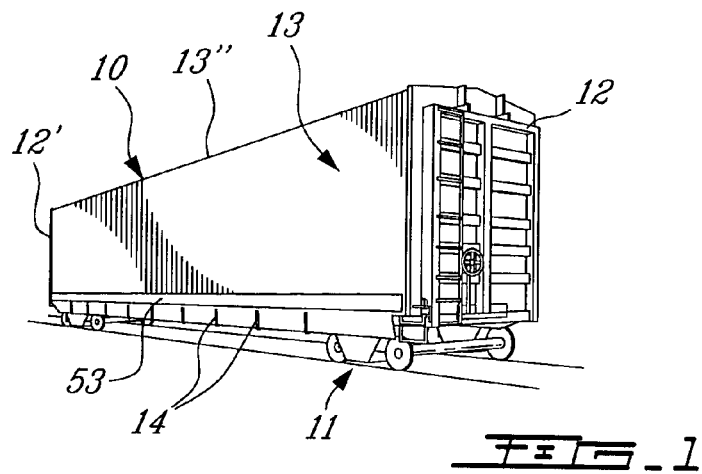
FIG_1
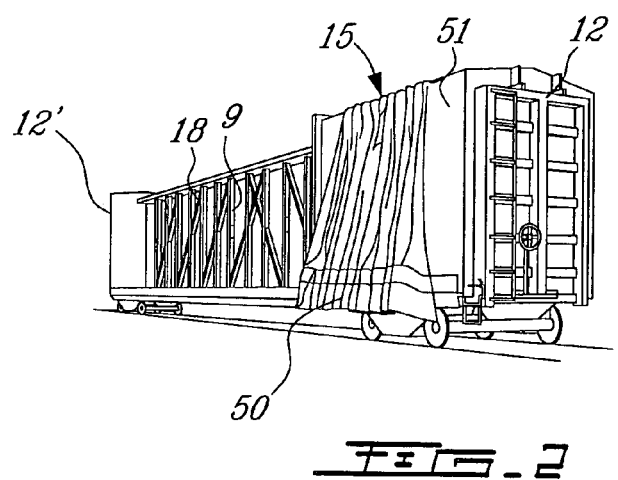
FIG_2
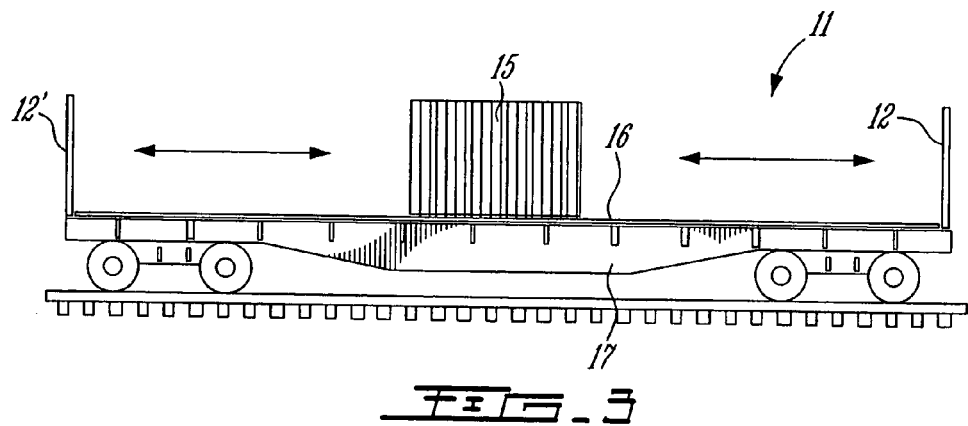
FIG_3

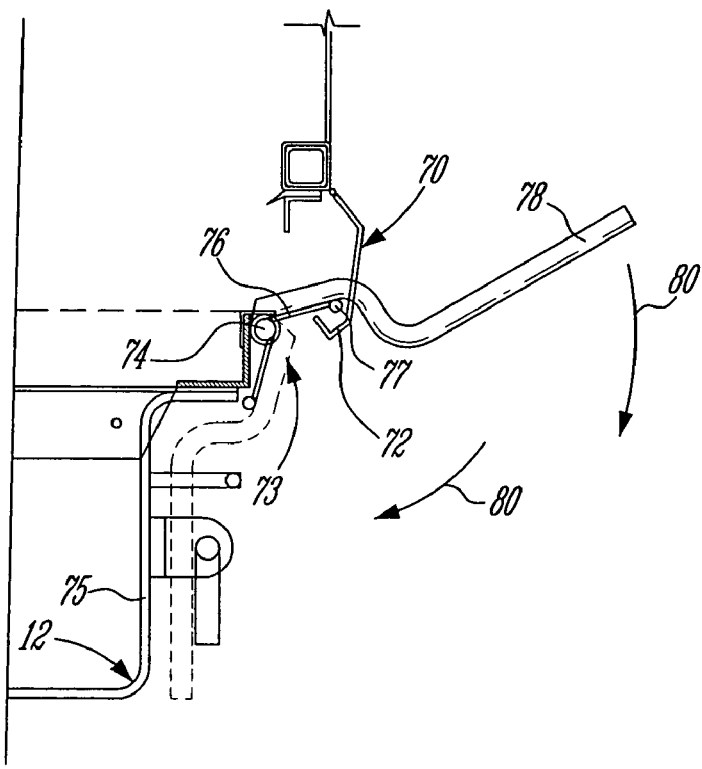
FIG_14
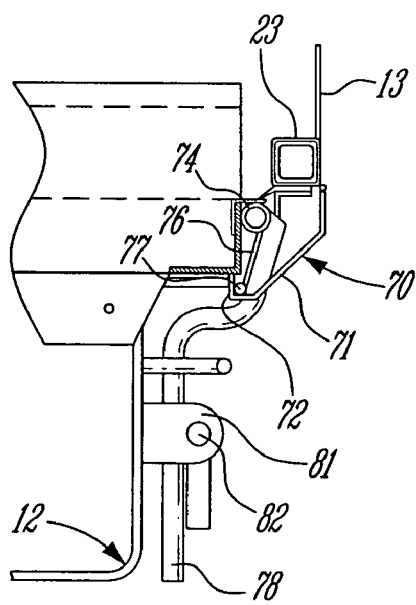
FIG_15

SLIDABLE COVER ASSEMBLY FOR MERCHANDISE CARRYING VEHICLE PLATFORMS

TECHNICAL FIELD

The present invention relates to a slidable cover assembly for merchandise carrying vehicle platforms and more particularly, but not exclusively, for railway cars equipped with opposed bulk heads and a top center beam.

BACKGROUND ART

It is known to cover open top-end vehicle platforms, such as railway cars and tractor trailers, with a tarp whereby to protect merchandise during transport. It is also known to provide a slidable cover assembly for such platforms and such is exemplified by, for example, U.S. Pat. Nos. 5,152, 575; 6,250,233 and European Patent EP 0 955 196 A1. Several other patent publications relate to covers for open top-end containers wherein the cover spans only the open top end of the transport container.

There are several problems with slidable cover assemblies and, for example, the lifespan of such assemblies is fairly short due to malfunctions and wear-and-tear. Some of these problems are attributed to the fact that these covers are damaged during installation and removal and by loading and unloading equipment working in the vicinity of these covers. For railway cars these covers are very large and difficult to install due to their large size and weight.

Further problems with slidable cover assemblies are that they are not able to slide in a way as to expose the entire area of the platform for loading and unloading merchandise and therefore need to be disassembled and this is a time-consuming and expensive job, often idling the railway car(s) for long periods of time. The structures supporting slidable cover assemblies have not been found adequate to provide proper operation and often leads to damage of the tarp during the displacement of its support frame assembly. Also, they do not provide adequate support of the top wall of the cover which may be subjected to snow or ice loads during winter months. Furthermore, the structure of these slidable cover assemblies has not been found adequate to protect the cover during displacement of the merchandise carrying vehicle platforms wherein air infiltrates behind the cover applying outward pressure thereto and causing ruptures in the tarp. Furthermore, with railway car platforms, the tarp is subjected to lateral pressure when two trains move in opposite directions in side-by-side relationship causing shearing forces on the side walls of the tarp. Many of these slidable cover assemblies are also motor-operated due to their heavy weight and this increases cost. Still further, the support mechanisms of these slidable covers often become defective and in order to effect repair, it is necessary to remove the entire slidable cover assembly from the transport vehicle platforms for maintenance purpose. If the vehicle platform is carrying merchandise this maintenance becomes very costly.

SUMMARY OF INVENTION

It is a feature of the present invention to provide a slidable cover assembly for merchandise carrying vehicle platforms and which substantially overcomes the above-mentioned disadvantages of the prior art.

Another feature of the present invention is to provide a slidable cover assembly for merchandise carrying vehicle platforms which can be displaced by one or two people without the use of motors or winches and which is capable of exposing the entire cargo area of the vehicle platform for loading and unloading merchandise.

Another feature of the present invention is to provide a slidable cover assembly for merchandise carrying vehicle platforms and wherein parts of the support assembly can be replaced or repaired without having to remove the slidable cover assembly from the platform.

Another feature of the present invention is to provide a slidable cover assembly for merchandise carrying vehicle platforms and wherein the tarp of the assembly as well as the support frame is protected against wind and other foreign matter which can damage the tarp and create malfunction of the support frame assembly.

Another feature of the present invention is to provide a slidable cover assembly for merchandise carrying vehicle platforms having a support frame structure which is displaceable to collapse the tarp from a collapsed to an extended condition while at the same time displacing the tarp outwardly of its side walls and folding its top wall to protect the tarp.

Another feature of the present invention is to provide a slidable cover assembly which is easy to assemble on a merchandise carrying vehicle platform and which can be quickly moved from an extended condition to a collapsed condition whereby to form a collapsed cover assembly package which can be displaced at any location along opposed support rails of the vehicle truck to expose all of the cargo area.

According to the above features, from a broad aspect, the present invention provides a slidable cover assembly for a merchandise carrying vehicle platform. The assembly comprises a pair of opposed end support frames and a plurality of intermediate frames, each having a top carriage for displacement on a central horizontal top center beam member secured to the platform. Each end support frames and intermediate frames have a top tapered roof truss structure and opposed depending side members. The side members have a side rail engaging carriage at a lower end thereof for displaceable support engagement with a side rail secured to opposed sides of a platform. A tarp is secured to the end support frames and intermediate frames and displaceable therewith from a collapsed condition to an extended condition. Tarp displacement means is provided to displace the tarp outwardly of the intermediate frames when displaced closer to one another from the extended condition to the collapsed condition. The end support frames have a vertical connecting flange means disposed vertically along at least a portion of the opposed depending side members at an outward end thereof and adapted to be detachably secured to a locking mechanism secured to stationary opposed bulk head frames of the platform.

BRIEF DESCRIPTION OF DRAWINGS

A preferred embodiment of the present invention will now be described with reference to the accompanying drawings in which:

FIG. 1 is a perspective view of the slidable cover assembly secured to a merchandise carrying platform of a railway car;

FIG. 2 is a perspective view similar to FIG. 1 and showing the support frame structure and tarp in a collapsed condition and positioned at one end of the platform;

FIG. 3 shows the relationship of the tarp and its support assembly in a collapsed condition and displaceable along support rails on opposed sides of the platform;

FIG. 14 is a fragmented section view showing the operation of the locking mechanism;

FIG. 15 is a top section view showing the locking mechanism in its engaged position and locked to the bulk head;

DESCRIPTION OF PREFERRED EMBODIMENTS

Figure 4:
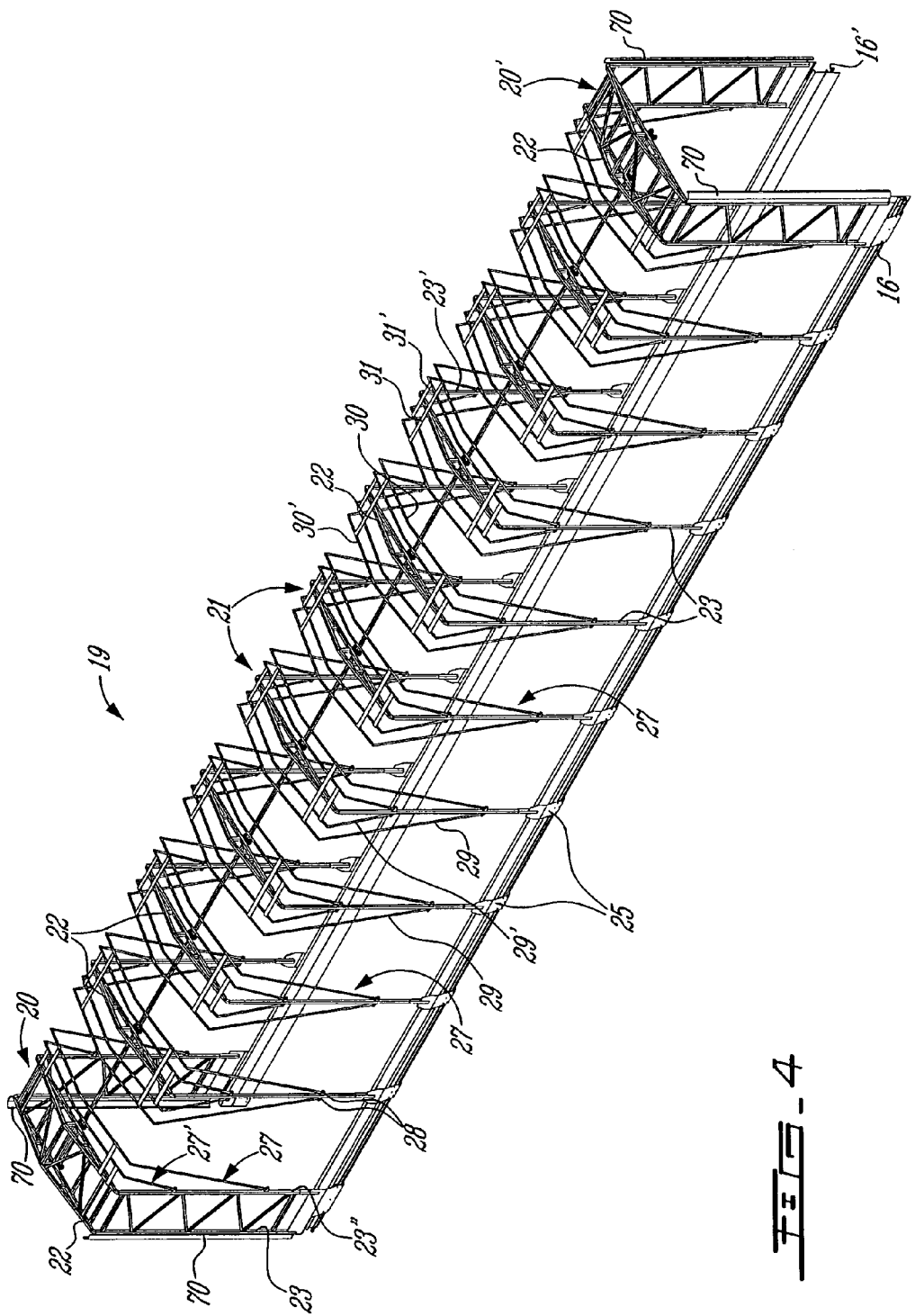
FIG. 4 is a perspective view showing the construction of the support frame assemblies and its displaceable securement to opposed rails secured on opposed sides of the platform.

Referring now to the drawings, and more particularly to FIG. 1, there is shown generally at 10 the slidable cover assembly of the present invention and secured to a railway vehicle merchandise carrying platform 11. As hereinshown, the platform 11 is provided with opposed bulk heads 12 and 12' and an extendable tarp 13 supported by frame members, as will be described later, which spans the cargo area 9 of the railway platform between the bulk heads 12 and 12'. The tarp is secured to the railway platform at a lower end thereof by tie-down straps 14 provided at spaced apart intervals on opposed sides of the assembly.

FIGS. 2 and 3 illustrate the slidable cover assembly in its retracted collapsed condition to form a displaceable collapsed package 15 which is movable along opposed rails 16 secured to the platform frame 17 on opposed sides thereof. Therefore, by displacing the collapsed package along these rails, the entire inner cargo area 9 of the platform can be exposed, as illustrated in FIG. 3. The railway merchandise carrying vehicle platform 11, as hereinshown, is provided with a central horizontal top beam 18 spanning the bulk heads 12 and 12' and the support frames are displaceably supported in a top portion thereof along this top beam 18 as will be described later in more detail.

With reference now to FIGS. 4 to 8, there will be described the construction and operation of the support frame assembly 19. As hereinshown, the support frame assembly 19 is comprised by a pair of opposed end support frames 20 and 20' and a plurality of intermediate frames 21 disposed therebetween. Each of the frames has a top tapered roof truss structure 22 and opposed depending side members 23 and 23'. The top roof truss structure 22 is provided with a top carriage assembly 24, as better illustrated in FIG. 6, for displacement on the central horizontal top beam 18 secured elevated between the bulk heads 12 and 12' of the vehicle truck 11.

Figure 7:
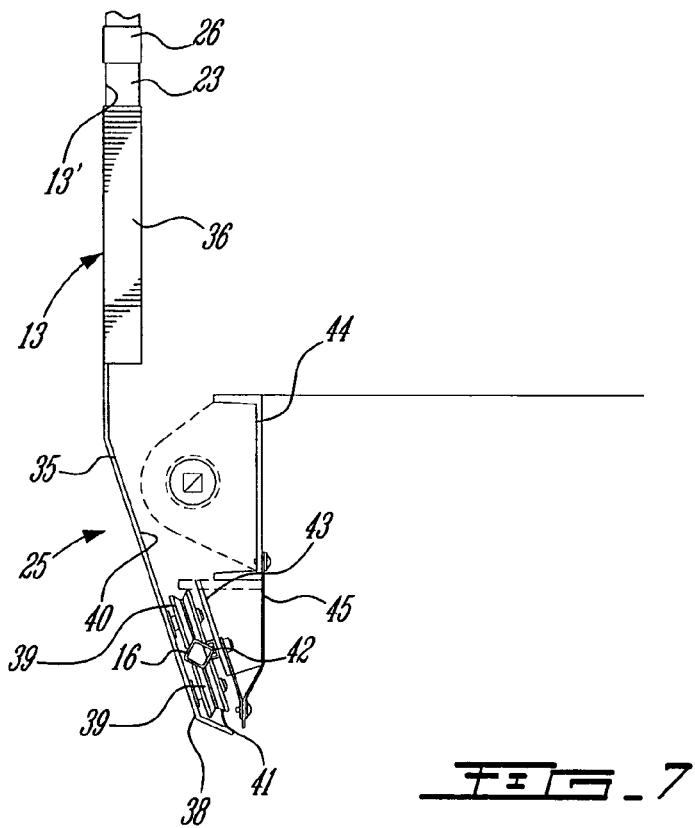
FIG. 7 is a fragmented section view showing the construction of the side rail engaging carriage secured at the lower end of the side members of the end support frames and intermediate support frames.

The side members 23 have a side rail engaging carriage 25 secured at a lower end thereof for displaceable support engagement on the opposed side rails 16 and 16' of the platform. The tarp 13 is permanently secured to the end support frames. Velcro straps 26 are secured to the inside wall 13' of the tarp 13, as illustrated in FIG. 7, and are used to attach the tarp to the intermediate frames. These straps are attached to the side members 23 at convenient locations.

Figure 8:
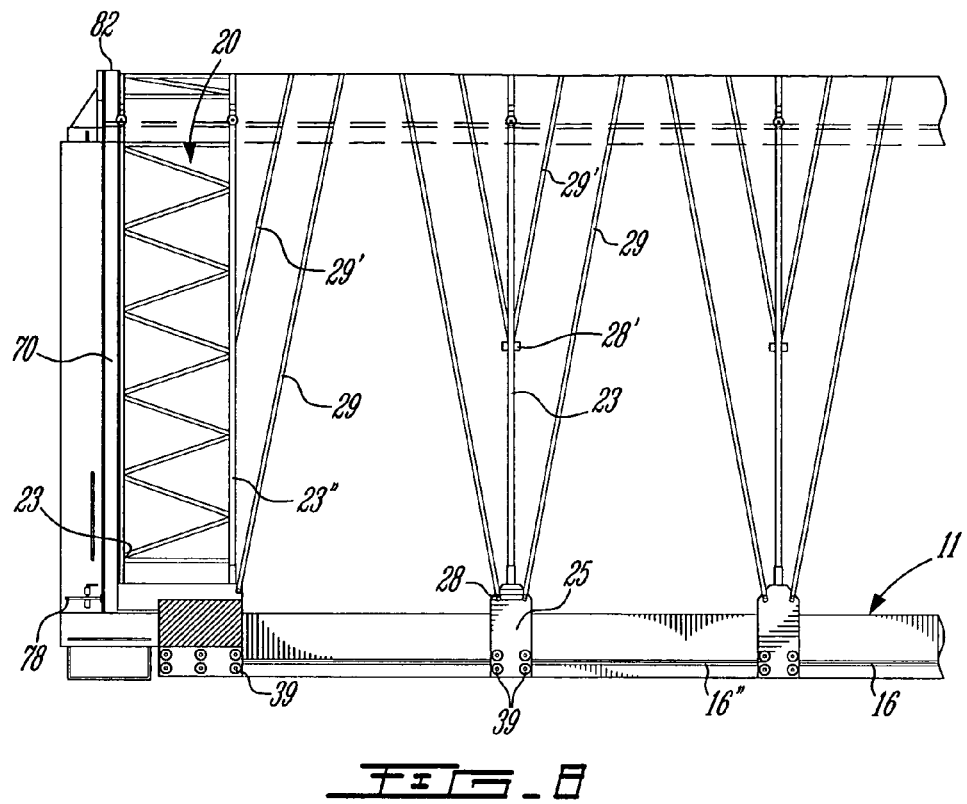
FIG. 8 is an enlarged end view showing the construction and relationship between the end support frames and the plurality of intermediate support frames and the connection of the end support frame to a bulk head of the platform.

As illustrated in FIGS. 4 and 8, the support frame assembly 19 is further provided with pivotal tarp support means, herein constituted by inverted U-shaped rod-like frames 27 and 27' which are hingedly secured by hinges 28 and 28' to at least some of the dependent side members 23 of some of the intermediate support frames 21 and also to an inner depending side member 23" of the end frames 20 and 20' whereby to support a top wall portion 13" of the extendable tarp 13 when in the extended condition. These inverted U-shaped rod-like frames 27 and 27' have depending arms 29 and 29' and a top cross-arm 30 and 30' interconnected together. Restraining means in the form of restraining straps 31 and 31' are connected to the truss structures 22 and to opposed ones of the inverted U-shaped rod-like frames 27 and 27', respectively, whereby to limit the angular displacement of the hinges of these inverted U-shaped rod-like frames on opposed sides of the intermediate frames. These inverted U-shaped rod-like frames 27 and 27' are also secured to an inner one of the depending side members, namely side members 23' of the end support frames 20 and 20'.

Figure 17:
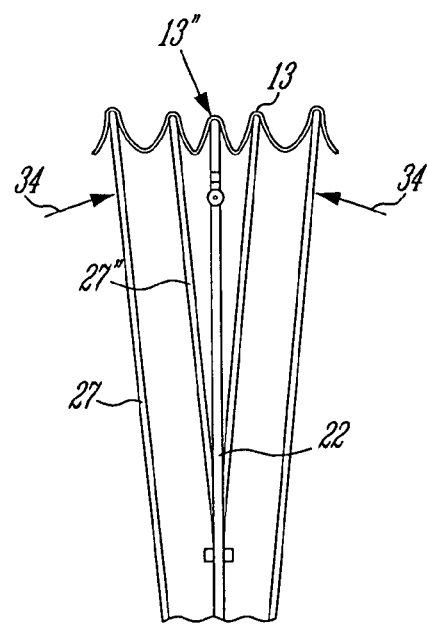
FIG. 17 is a fragmented side view showing the position of the inverted U-shaped rod-like frames when in the collapsed position whereby to support the top wall of the tarp in an accordion fashion about the roof trusses of the intermediate support frames and the inner truss of the end frames.

As shown in FIG. 17, these end support frames 20 and 20' and intermediate frames 21 are constructed of light-weight structural aluminum modular pieces interconnected together by joint connectors 32 and the like and secured by bolt fasteners 33. The inverted U-shaped rod-like frames 27 and 27' are also light-weight tubular frames and these may be formed as a single section frame of interconnected frame members.

As shown in FIG. 17, when the frame members are displaced along the rails 16 and 16' closer to one another, they cause the tarp support frames 27 and 27' to be pushed and pivot on their hinges inwardly in the direction of arrows 34 and towards the depending side members 23 and roof truss structure 22 whereby to push upwardly and fold the roof portion 13" of the tarp in an accordion fashion to clear the load area.

As shown in FIG. 7, the side rail engaging carriages 25 are each comprised of a leg plate 35 to which is detachably secured a lower end of the side members 23. As hereinshown, the side members are received in a vertical tubular pocket 36 secured behind the leg plate 35 and retained therein by a fastener 37. Accordingly, these side rail engaging carriages and intermediate frames can be easily detached from each other for repair or assembly.

The leg plate 35 has a depending protective lower portion 38 and at least one pair of wheels 39 are secured in spaced-apart vertical relationship (see FIG. 8) to a rear wall 40 of the lower portion 38 of the leg plate. These pairs of wheels 39 are spaced apart from one another whereby to receive therebetween the rail 16. As hereinshown, the rail 16 is of rectangular cross-section and secured to an elongated track bracket 43 which is secured to a side frame 44 of the platform. The rail 16 is secured transversely offset 90° (ninety degrees) whereby these wheels 39 which have a V-shape groove 41 are held captive on opposed apex edges 42 of the rail 16. The top or uppermost one of the pair of wheels 39 is rotatably displaceable on the top apex of the rail for displacement of the support frames. The lower one of the wheels 39 is in frictional rotational engagement with the bottom apex of the rail for retention of the opposed frames thereon.

As shown in FIG. 8, a rear protective wall 45 is secured inwardly of the rail and to the track bracket 43 whereby together with the depending protective lower portion 38 of the leg plate 35 provides a protective housing for the wheels secured to the rear wall 40 of the leg plate.

Figure 11:
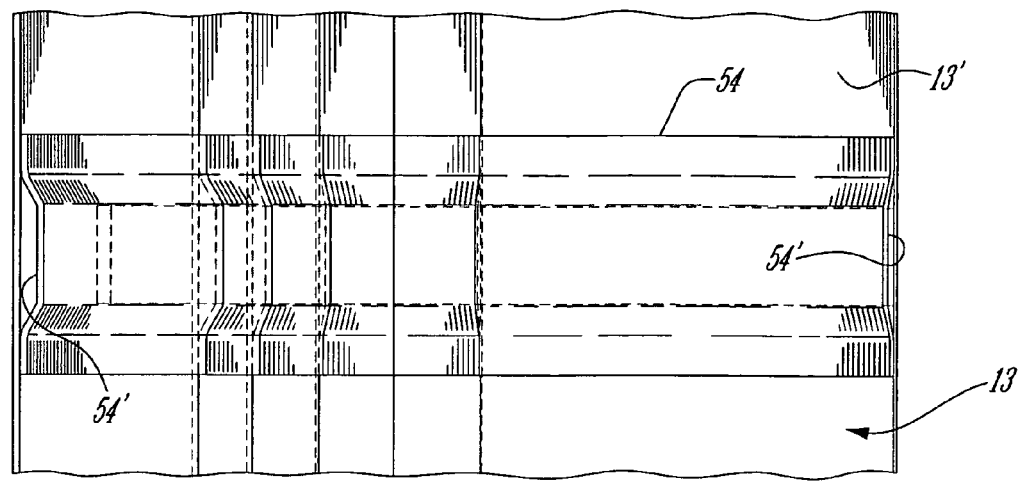
FIG. 11 is a fragmented plan view showing the pocket formed on the inner surface of portions of the tarp for receiving therein a pleat former to provide outward displacement of a tarp side section.
Figure 12:
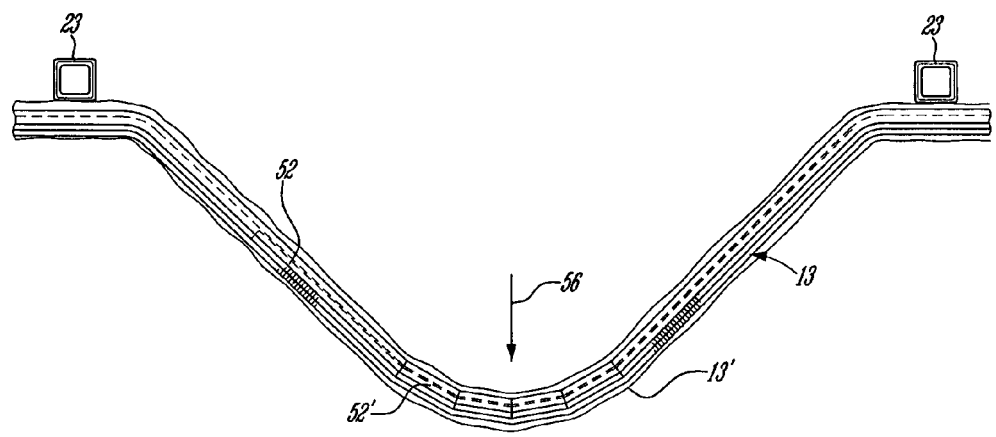
FIG. 12 is a section view showing the configuration of the pleat formers when the frames are displaced to their collapsed condition whereby the tarp is displaced outwardly by the pleat formers.

As shown in FIG. 2, when one of the end support frames or both are pushed towards one another, they cause the intermediate frames to move on the rails 16 and 16' closer to one another to reach a tarp collapsed condition as, for example, illustrated by reference numeral 15 in FIGS. 2 and 3. As shown in FIG. 2, when in this collapsed condition, the tarp 13 flares out in its side walls, as illustrated by reference numeral 50, from the top of its side walls 51 to the bottom thereof. This flaring out is obtained by tarp displacement means, herein referred to as pleat formers, as illustrated in FIGS. 11 and 12. These pleat formers 52 are secured to the tarp at predetermined spaced locations, herein along the band area 53 as illustrated in FIG. 1. Horizontal pockets 54 are secured to the inner surface or inside wall 13' of the tarp 13 and extend between the intermediate frames and the end frames. The pleat formers 52 are flexible angled flat bars having a memory bent profile whereby to achieve a desirable bent profile 55, as shown in FIG. 12. As the support frames and tarp are displaced to their collapsed condition, the pleat formers 52 spring outwardly in the direction of arrow 56, as dictated by their bent memory profile whereby to displace the tarp outwardly of the frame members causing the tarp to flare out to permit the frames to be positioned closer together and prevent malfunction of the frames.

In a preferred embodiment, the pleat former is constituted as an elongated rectangular flat bar which is molded from rigid plastic material, as shown in FIG. 12, and prebent to move in a predetermined direction (see arrow 56) when released form a flattened condition, when disposed within the pocket, to a normal pre-bent extended condition, as shown in FIG. 12. This assembly makes it easy to change the pleat formers if defective and to assemble them in the tarp.

Figure 5:
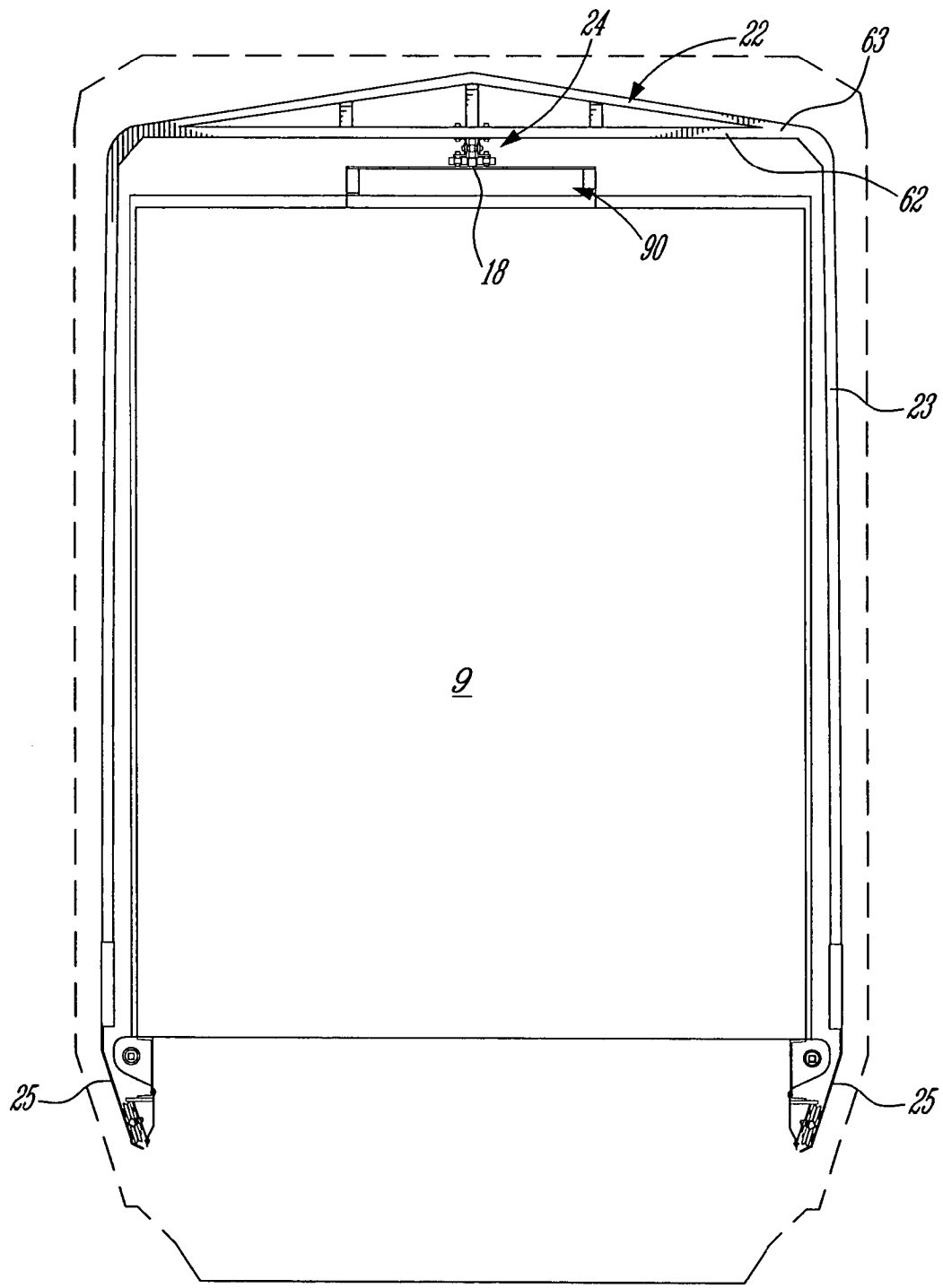
FIG. 5 is an end view showing the construction of an intermediate support frames.
Figure 6:
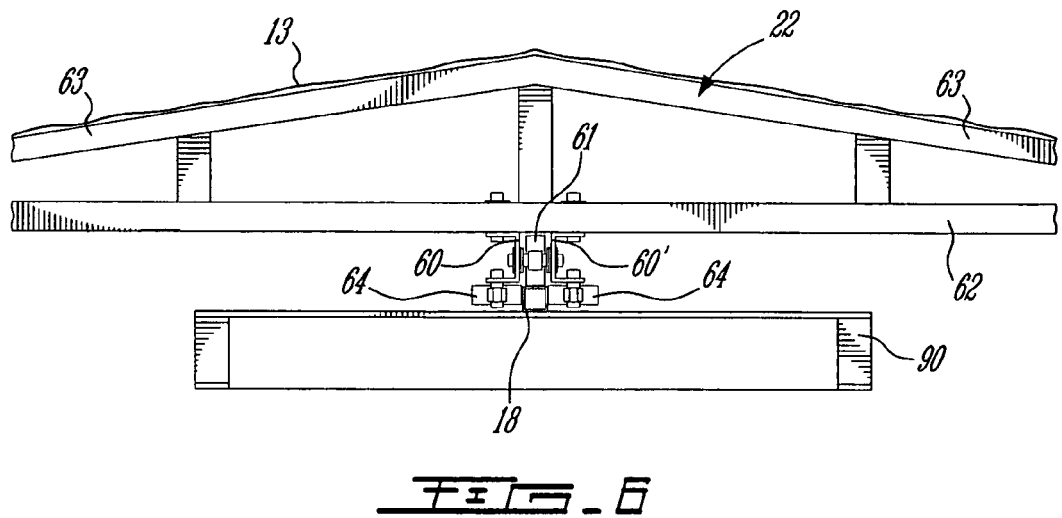
FIG. 6 is a fragmented end view of the roof truss design and its carriage assembly engageable with a top rail of the system which is secured to the vehicle platform.

These support frames can be displaced by only two people pushing on an opposed side of the end frames to displace them along the opposed lower rails 16 and 16'. These frames are also supported by the top carriage assembly 24 as illustrated in FIGS. 5 and 6. The top carriage assembly consists essentially of a pair of opposed brackets 60 and 60' as shown in FIG. 6 having secured therebetween a vertical support wheel 61. The brackets are secured to a cross-arm member 62 of the top roof truss structure 22. The top roof truss structure 22 has tapered truss members 63 whereby the tarp 13 supported thereon can shed water to opposed sides of the merchandise carrying vehicle. A pair of side support wheels 64 are secured to these brackets 60 and 61 to engage the top beam or top rail 18 on opposed sides thereof. As hereinshown the top rail 18 is secured to the center beam 90 spanning the bulkheads of a railway car. Accordingly, the support frame members are maintained in a straight line and in parallel relationship to one another as they are displaced along the top beam member 18 and the side rails 16 and 16'.

Figure 16:
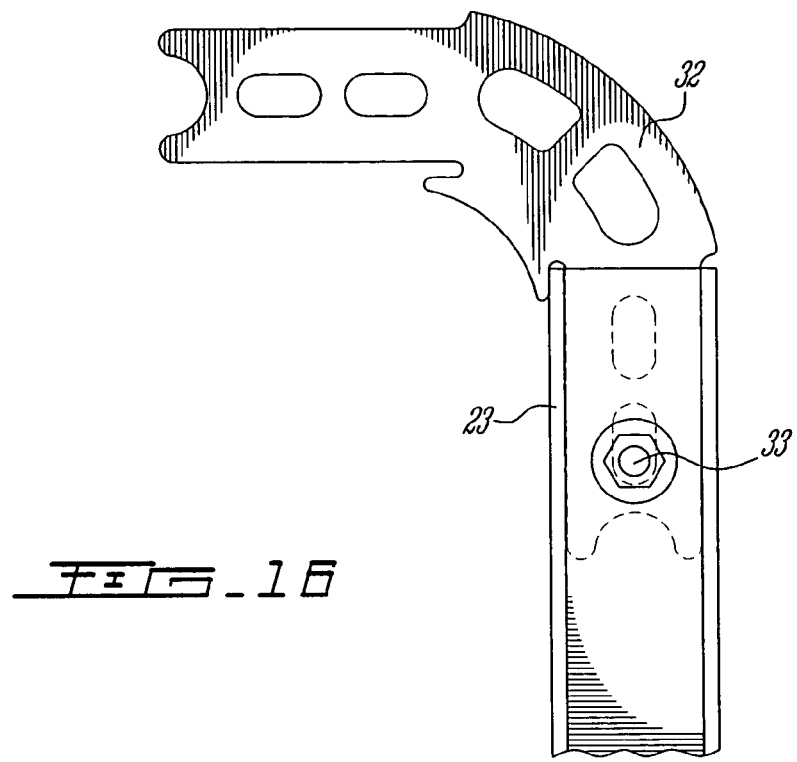
FIG. 16 is a fragmented section view showing an example of some of the connectors of a top corner of the modular construction of the support frame members.

With reference now to FIGS. 8 and 13 to 15, there will be described the construction and operation of the vertical connecting wing flange 70 which is secured to each outer depending side member 23 of the end support frames 20 and 20' as better illustrated in FIG. 8. As illustrated more clearly in FIG. 16, the connecting wing flange 70 has a rearwardly angulated tapered section 71 to deflect wind outwardly when the merchandise carrying vehicle is in motion preventing wind from infiltrating behind the tarp 13. It also has a hook formation 72 at a forward end thereof for engagement by a locking mechanism 73 whereby to pull the end support frames 20 and 20' firmly connected to the bulk heads 12 and 12', respectively. The wing flange 70 is a structural wing flange constructed of metal, such as aluminum or stainless steel.

The locking mechanism 73 comprises an elongated hinge member 74 secured along and adjacent a forward side wall 75 of the bulk heads 12 and 12' with the hinge 74 supporting at a free end of a pivotal flange 76 an elongated connecting rod 77. An actuating arm 78 is connected to the pivotal flange 76 and the connecting rod 77 adjacent a lower end of the connecting rod and the wing flange 70 is provided with a slot opening 79 adjacent a lower end thereof, as illustrated in FIG. 4, whereby to permit passage of the actuating arm 78. In order to secure the end support frames 20 and 20' to their respective bulk heads, the wing flange 70 has its hook formation 72 positioned over the connecting rod 77 and by pulling the actuating arm in the direction of arrow 80, as shown in FIG. 14, this will pull the end support frames toward the bulk heads and to an engaged position, as shown in FIG. 15.

Figure 13:
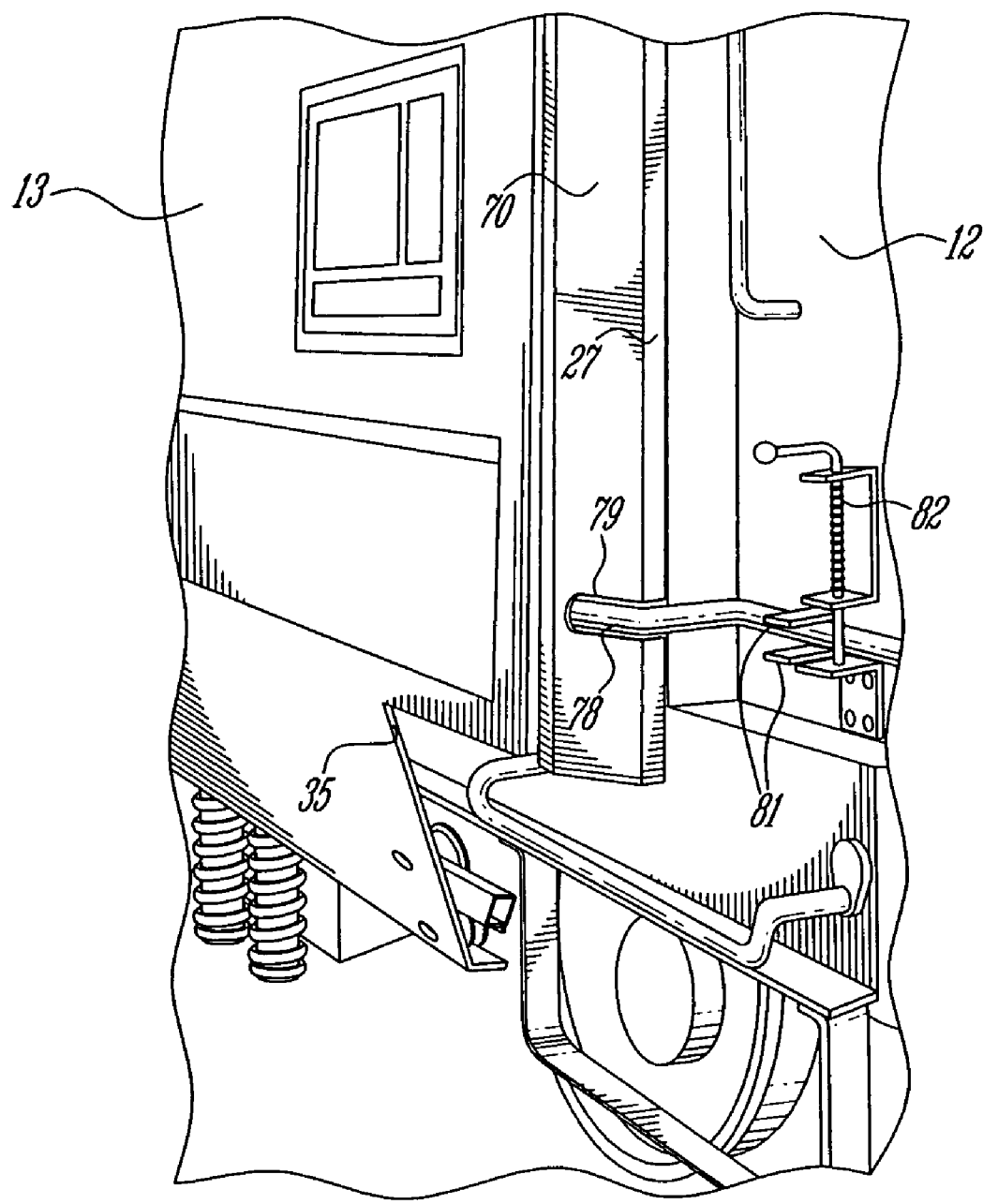
FIG. 13 is a perspective view showing a portion of the wing flange and its connection to the bulk head by the locking mechanism.

As shown FIGS. 13 and 15, the actuating arm 78 is positioned into a lock which is constituted by a pair of projecting flanges 81 and a spring-loaded locking rod 82 which is displaceable between the flanges whereby to retain the actuating arm 78 in a locked position against the bulk head. When all four wing flanges are secured to their respective locking mechanisms, in all four corners of the truck bulk heads, the tarp is secured between the bulk heads. To disconnect it, the latch locking rod 82 is pulled upwardly to permit the actuating arm 78 to be moved outwardly from between the flanges 81 thereby releasing the wing flanges 70.

Figure 9:
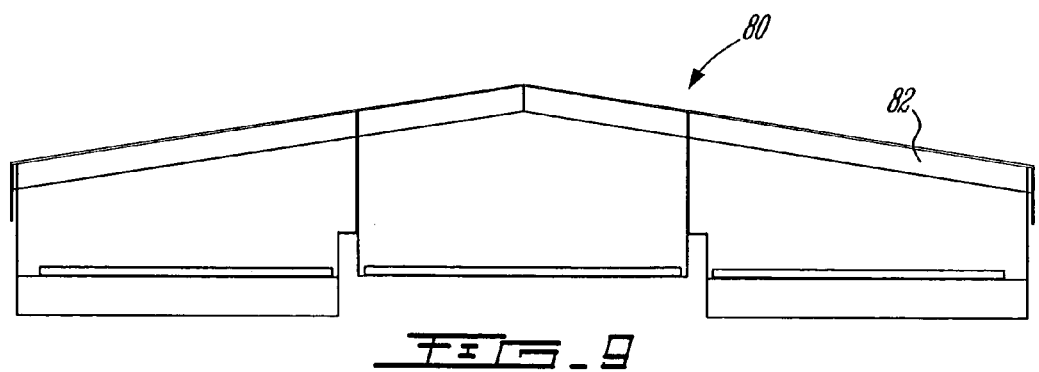
FIG. 9 is an end view showing the construction of the bulk head top extension cover.
Figure 10:
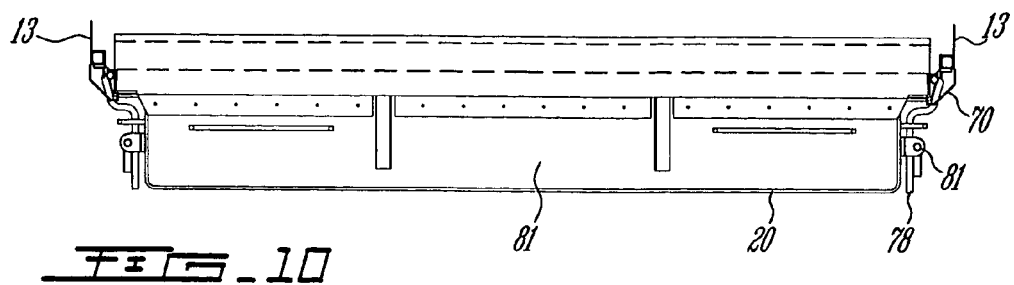
FIG. 10 is a top view showing the bulk head top extension cover secured to the bulk head and the securement of the opposed wing flanges to opposed locking mechanisms secured to the bulk head.

As shown in FIGS. 9 and 10, the bulk heads 12 and 12' are further retrofitted with a top extension cover 80 secured to a top wall 81 of the bulk heads 12 and 12'. This top extension cover 80 has an overhanging inwardly projecting top flange wall 82 to overhang the end portions of the end support frames 20 and 20' and over the tarp end edges whereby to deflect rainwater or snow over the tarp and also to prevent wind infiltration during movement of the vehicle.

It is also pointed out that the rails 16 and 16' are provided with removable sections 16", as illustrated in FIG. 8, to permit side access to portions of the rail truck 11 and to permit the removal of any of the support frames 19 and 20 by positioning them over the removed track section(s) without having to disassemble the entire support frame assembly. Accordingly, repair or replacement parts can be done to any of the support frame assemblies without having to remove the entire assembly from the platform. The rails can also be bent inwards along a central area of its length to meet railway regulations as to distances between railway cars when meeting in curved track sections.

Although in the preferred embodiment described herein the merchandise carrying vehicle platform is a center beam railway car, it is also within the ambit of the present invention to adapt such slidable cover assemblies on tractor trailer flat beds which can be retrofitted with side rails and bulk head frames. The tarp fabric is a tough, composite material, such as heavy synthetic fabric and all fabric joints are high-frequency welded or hot air welded making the cover water-proof, durable and dimensionally stable. The attachment Velcro straps 26 are also constructed of strong material which is bonded to the inner side wall of the cover. This type of cover structure also makes it feasible to repair the cover in the field by using a heat gun. The support structures are also manufactured from transport grade aluminum as their corner connectors. The modular structure of the design also allows for ease of installation and replacement of parts. An important feature of the slidable cover assembly of this invention is that the support frames can be moved along their support tracks to one end of the truck by only one or two people and the fabric bunches up in an accordion-like fashion as the frames get closer to one another and the entire collapsed assembly can then be pushed along the rails to clear the entire cargo area. To close the assembly, the end support assemblies are pulled back and the wings are engaged by the locking mechanisms in all four corners. Because the system is operated by only one or two people at ground level, this greatly reduces cost and improves safety. Obviously, a winch and cable may be adapted for one person operation.

It is within the ambit of the present invention to cover any obvious modifications of the preferred embodiment described herein, provided such modifications fall within the scope of the appended claims.

What is claimed is:

1. A slidable cover assembly for merchandise carrying vehicle platforms, said assembly comprising a pair of opposed end support frames and a plurality of intermediate frames, each said frame having a top carriage for displacement on a central horizontal top rail member secured to a platform, each said end support frames and intermediate frames having a top tapered roof truss structure and opposed depending side members, said side members having a side rail engaging carriage at a lower end thereof for displaceable support engagement with a side rail secured to opposed sides of a truck, a tarp secured to said end support frames and intermediate frames and displaceable therewith from a collapsed condition to an extended condition, tarp displacement means to displace said tarp outwardly of said intermediate frames when displaced closer to one another from said extended condition to said collapsed condition, said end support frames having a vertical connecting flange means disposed vertically along at least a portion of said opposed depending side members at an outward end thereof and adapted to be detachably secured to a locking mechanism secured to stationary opposed bulk head frames of said platform.

2. A slidable cover assembly as claimed in claim 1 wherein there is further provided pivotal tarp support means hingedly secured to at least some said intermediate frames to support a top wall portion of said tarp when in said extended condition.

3. A slidable cover assembly as claimed in claim 2 wherein said pivotal tarp support means comprises an inverted U-shaped rod-like frame having opposed depending arms and top cross-arm, said depending arms being pivotally secured to respective ones of said depending side members, there being one of said rod-like frames on opposed sides of said intermediate frames, and restraining means to limit the angular displacement of said rod-like frame with respect to said intermediate frame, said top cross-arm collapsing said top wall portion of said tarp in an accordion fashion between said intermediate frames when said tarp is displaced to said collapsed condition.

4. A slidable cover assembly as claimed in claim 3 wherein said inverted U-shaped rod-like frame is a lightweight tubular frame, said restraining means being restraining straps connected to said tubular frames.

5. A slidable cover assembly as claimed in claim 4 wherein there are pairs of said rod-like frames on opposed sides of each said intermediate frames.

6. A slidable cover assembly as claimed in claim 5 wherein a pair of said rod-like frames is also secured to a vertical inner area of said end support frames.

7. A slidable cover assembly as claimed in claim 1 wherein said tarp displacement means is constituted by pleat formers secured to said tarp at predetermined locations on opposed side walls of said tarp; said pleat formers springing outwardly, when said tarp is displaced to said collapsed condition by displacing said end frames and intermediate frames closer to one another, whereby to push said tarp side walls to flare outwardly between said intermediate frames.

8. A slidable cover assembly as claimed in claim 7 wherein said pleat formers are elongated rectangular flat bars having an angled memory, said bars being retained flat over an inner surface of said tarp side walls in restraining pockets horizontally disposed along an inner surface of said tarp at predetermined spaced intervals.

9. A slidable cover assembly as claimed in claim 8 wherein said flat bars are rigid plastic bars to provide a controlled outward bent profile as said end fames and intermediate frames are displaced closer to one another.

10. A slidable cover assembly as claimed in claim 1 wherein said side rail engaging carriage is comprised of a leg plate to which said lower end of said side members is removably secured, said leg plate having a depending protective lower portion, at least one pair of wheels secured in spaced-apart vertical relationship to a rear wall of said lower portion of said leg plate and receiving therebetween said rail, a top one of said pair of wheels rotatably displaceable on a top of said rail for displacement of said end and intermediate support frames, and a lower one of said pair of wheels being in frictional rotational engagement with a bottom of said rail for retention of said end and intermediate support frames on said rail.

11. A slidable cover assembly as claimed in claim 10 wherein there is further provided a rear protective wall secured inwardly of said rail and together with said depending protective lower portion of said leg plate providing a protective housing for said wheels and said rails.

12. A slidable cover assembly as claimed in claim 10 wherein there are two of said pair of wheels secured in aligned spaced relationship, and said tracks being secured to an elongated track bracket secured to said opposed sides of said platform.

13. A slidable cover assembly as claimed in claim 10 wherein said leg plate is provided with a vertical tubular pocket for receiving a lower end of said side members, and means to retain said lower end of said side members in said pocket.

14. A slidable cover assembly as claimed in claim 1 wherein said tarp is secured to said end support frames and intermediate frames by interconnecting straps located on an inner surface of said tarp, and tie-down straps secured to said tarp at spaced intervals along a lower end section of opposed side walls of said tarp and to a lower stationary member of said platform to maintain said tarp firmly fastened.

15. A slidable cover assembly as claimed in claim 1 wherein said vertical connecting flange means is a wing flange having a forward engaging longitudinal hook end formation, said locking mechanism having an elongated vertical structural rod pivotally secured to said bulk head frame on opposed sides thereof, and displaceable to be received in said hook end formation by a lever, said lever; when displaced to a locking position, pulling on said end frame and said tarp longitudinally thereof to secure said end frames to a respective one of said bulk head frames on opposed sides thereof and pull said tarp firm, and means to secure said lever at said locking position.

16. A slidable cover assembly as claimed in claim 15 wherein said means to secure said lever at said locking position comprises a latch assembly immovably secured to said bulk head frame for releasable locking engagement of said lever.

17. A slidable cover assembly as claimed in claim 1 wherein said vehicle platform is a center beam railcar having a flat bed and opposed bulkheads, said top rail being secured to a center beam spanning said bulkheads said top carriage being secured to at least some of said top tapered roof trusses and comprised of a guide wheel assembly, said guide wheel assembly having a top support wheel for displacement along a flat top edge of said center beam and a pair of side wheels spaced-apart for frictional engagement with opposed flat side edges of said center beam.

18. A slidable cover assembly as claimed in claim 17 wherein there is further provided a bulk head top extension cover secured to a top wall of said bulkheads and overhanging inwardly of said bulkheads whereby to receive in close fit thereunder outer sections of said opposed end frames and end portions of tarp secured thereto.

19. A slidable cover assembly as claimed in claim 17 wherein each said rails have a removable section to permit the removal and mounting of any of said end frames and intermediate frames thereto and to permit access to portions of said rail car.

20. A slidable cover assembly as claimed in claim 1 wherein said end support frames and intermediate frames are modular tubular frames comprising tubular rod sections interconnected together by insert connectors.

\* \* \* \* \*